(12) United States Patent
Lestrade et al.

(10) Patent No.: US 10,203,155 B2
(45) Date of Patent: Feb. 12, 2019

(54) METHOD AND DEVICE FOR CONDENSING A FIRST FLUID RICH IN CARBON DIOXIDE USING A SECOND FLUID

(75) Inventors: Michel Lestrade, Ville D'Avray (FR); Fabrice Rivoal, Vitry sur Seine (FR)

(73) Assignee: L'Air Liquide Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 413 days.

(21) Appl. No.: 13/996,915

(22) PCT Filed: Dec. 22, 2011

(86) PCT No.: PCT/FR2011/053142
§ 371 (c)(1),
(2), (4) Date: Jun. 21, 2013

(87) PCT Pub. No.: WO2012/085471
PCT Pub. Date: Jun. 28, 2012

(65) Prior Publication Data
US 2013/0298598 A1    Nov. 14, 2013

(30) Foreign Application Priority Data
Dec. 23, 2010  (FR) ..................... 10 61158

(51) Int. Cl.
| | |
|---|---|
| *F25J 1/00* | (2006.01) |
| *B01D 3/32* | (2006.01) |
| *B01D 5/00* | (2006.01) |
| *B01D 53/00* | (2006.01) |
| *F25J 3/02* | (2006.01) |

(52) U.S. Cl.
CPC ............. *F25J 1/0027* (2013.01); *B01D 3/32* (2013.01); *B01D 5/0063* (2013.01); *B01D 5/0084* (2013.01); *B01D 5/0087* (2013.01);
*B01D 53/002* (2013.01); *F25J 3/0266* (2013.01); *B01D 2257/504* (2013.01); *F25J 2200/02* (2013.01); *F25J 2200/74* (2013.01); *F25J 2200/80* (2013.01); *F25J 2210/02* (2013.01); *F25J 2220/82* (2013.01); *F25J 2250/02* (2013.01); *F25J 2270/12* (2013.01);
(Continued)

(58) Field of Classification Search
CPC .............................. F25J 1/0027; F25J 1/0052
See application file for complete search history.

(56) References Cited

U.S. PATENT DOCUMENTS

| | | | |
|---|---|---|---|
| 2,916,888 A |  | 12/1959 | Cobb, Jr. |
| 3,285,028 A | * | 11/1966 | Newton ................. F25B 9/004 |
| | | | 62/117 |

(Continued)

FOREIGN PATENT DOCUMENTS

| | | | |
|---|---|---|---|
| EP | 1026463 A1 | 8/2000 | |
| WO | 2009083227 A2 | 7/2009 | |
| WO | WO 2011091014 A2 * | 7/2011 | ............... F25B 1/10 |

OTHER PUBLICATIONS

PCT/EP2011/053142, International Search Report, dated Apr. 12, 2012.

(Continued)

*Primary Examiner* — Tareq Alosh
(74) *Attorney, Agent, or Firm* — Justin K. Murray

(57) ABSTRACT

The present invention relates to a process and device for condensing a first fluid rich in carbon dioxide using a second fluid.

7 Claims, 3 Drawing Sheets

(52) U.S. Cl.
CPC ........... *F25J 2270/90* (2013.01); *Y02C 10/12* (2013.01); *Y02P 70/34* (2015.11)

(56) References Cited

U.S. PATENT DOCUMENTS

| | | | |
|---|---|---|---|
| 4,303,427 A | | 12/1981 | Krieger |
| 4,404,008 A | * | 9/1983 | Rentler .................. F25J 1/0022 |
| | | | 62/612 |
| 4,576,615 A | | 3/1986 | Netzer et al. |
| 4,622,053 A | * | 11/1986 | Tomlinson ................ C07C 7/09 |
| | | | 62/621 |
| 4,639,257 A | | 1/1987 | Duckett et al. |
| 4,695,304 A | | 9/1987 | Sapper |
| 4,699,642 A | | 10/1987 | Perry et al. |
| 4,704,146 A | | 11/1987 | Markbreiter et al. |
| 4,753,666 A | * | 6/1988 | Pastor ................... E21B 43/164 |
| | | | 62/47.1 |
| 4,762,543 A | | 8/1988 | Pantermuehl et al. |
| 4,976,849 A | * | 12/1990 | Soldati ...................... C07C 7/04 |
| | | | 208/351 |
| 4,977,745 A | | 12/1990 | Heichberger |
| 4,990,168 A | | 2/1991 | Sauer et al. |
| 5,724,805 A | | 3/1998 | Golomb et al. |
| 5,974,829 A | | 11/1999 | Novak et al. |
| 6,035,662 A | | 3/2000 | Howard et al. |
| 6,070,431 A | | 6/2000 | Howard |
| 6,085,549 A | | 7/2000 | Daus et al. |
| 6,301,927 B1 | | 10/2001 | Reddy |
| 6,477,859 B2 | | 11/2002 | Wong et al. |
| 7,461,522 B2 | | 12/2008 | Howard |
| 7,666,251 B2 | | 2/2010 | Shah et al. |
| 7,708,804 B2 | | 5/2010 | Darde et al. |
| 7,891,201 B1 | * | 2/2011 | Bush ........................ F25B 1/10 |
| | | | 62/115 |
| 8,475,566 B2 | | 7/2013 | Find |
| 2003/0133864 A1 | * | 7/2003 | Billingham ............ B01D 15/00 |
| | | | 423/437.1 |
| 2003/0161780 A1 | | 8/2003 | Howard et al. |
| 2006/0260358 A1 | | 11/2006 | Kun |
| 2007/0148068 A1 | | 6/2007 | Burgers et al. |
| 2007/0148070 A1 | | 6/2007 | Chakravarti et al. |
| 2007/0231244 A1 | | 10/2007 | Shah et al. |
| 2007/0234750 A1 | | 10/2007 | Kalina |
| 2008/0022706 A1 | * | 1/2008 | Sakimichi ................ F25B 1/10 |
| | | | 62/190 |
| 2008/0173584 A1 | | 7/2008 | White et al. |
| 2008/0173585 A1 | | 7/2008 | White et al. |
| 2008/0176174 A1 | | 7/2008 | White et al. |
| 2008/0196583 A1 | | 8/2008 | Ha |
| 2008/0196584 A1 | | 8/2008 | Ha |
| 2008/0196585 A1 | | 8/2008 | Ha |
| 2008/0245101 A1 | | 10/2008 | Dubettier-Grenier et al. |
| 2009/0013717 A1 | | 1/2009 | Darde et al. |
| 2009/0013868 A1 | | 1/2009 | Darde et al. |
| 2009/0101007 A1 | | 4/2009 | Find |
| 2009/0288556 A1 | | 11/2009 | Gearhart et al. |
| 2009/0298957 A1 | | 12/2009 | Gauthier et al. |
| 2010/0077795 A1 | | 4/2010 | Shah et al. |

OTHER PUBLICATIONS

FR 1061158, Search Report and Written Opinion, dated Jul. 13, 2011.

* cited by examiner

METHOD AND DEVICE FOR CONDENSING A FIRST FLUID RICH IN CARBON DIOXIDE USING A SECOND FLUID

CROSS-REFERENCE TO RELATED APPLICATIONS

This application is a § 371 of International PCT Application PCT/FR2011/053142, filed Jun. 28, 2012, which claims § 119(a) foreign priority to French patent application 1061158, filed Dec. 22, 2010.

FIELD OF THE INVENTION

The present invention relates to a process and device for condensing a first fluid rich in carbon dioxide using a second fluid.

BACKGROUND

More particularly, the present invention relates to the field of the condensation of a first fluid, referred to as a calorigenic fluid, rich in carbon dioxide ($CO_2$), containing for example at least 50 mol % of carbon dioxide, or even at least 80 mol % of carbon dioxide, by evaporation of a second fluid, referred to as a refrigerant fluid, for example ammonia ($NH_3$). This condensation is carried out in a heat exchanger.

The vaporized refrigerant fluid is then sent to equipment downstream, for example another heat exchanger, or an inlet of a compressor or of a compression stage of the refrigerant cycle, with a view to then itself being cooled and condensed at higher pressure for a new cycle.

It is important in this case to limit the liquid portion of the second fluid exiting the first heat exchanger, to avoid, depending on the case, for example a maldistribution in the next exchanger, or mechanical problems in the compressor.

Generally, the refrigerant fluid is in general provided liquid, at a pressure above the operating pressure in the exchanger. It may be more or less sub-cooled, but its expansion to the operating pressure generally gives rise to a greater or lesser partial vaporization (flash).

SUMMARY OF THE INVENTION

According to one subject of the invention, a process is provided for condensing a first fluid rich in carbon dioxide using a second fluid comprising steps of:
  phase separation in order to obtain a liquid portion and a gaseous portion of said second fluid in a phase separator; and
  heat exchange in the heat exchanger between the liquid portion of the second fluid and the first fluid in order to liquefy the first fluid at least partially and in order to at least partially vaporize the second fluid.
  According to other optional aspects:
  the second fluid is expanded and sent entirely to the phase separation step.
  the second fluid has a different chemical composition from the first fluid and optionally does not contain carbon dioxide.
  a two-phase fluid resulting from the vaporization of the second fluid is sent to the phase separator.
  the second fluid is entirely vaporized by the heat exchange in the heat exchanger.
  the second fluid is heated in the heat exchanger after its vaporization in order to form a superheated gas.
  the gas formed by vaporizing the second fluid is mixed with the gaseous portion outside of the phase separator.
  the first fluid originates at least partly from the top of a distillation column and the first fluid condensed is sent to the top of the distillation column.
  a first gaseous fraction rich in carbon dioxide originating from the top of the distillation column is mixed with a second gaseous fraction rich in carbon dioxide in order to form the first fluid.
  the ratio between the total volume of the second fluid in the phase separator and the flow rate of the second fluid at the inlet to the phase separator is between 0.01 and 0.05 L·h/$Nm^3$, or even between 0.012 and 0.047 L·h/$Nm^3$.
  the ratio between the volume of the liquid portion of the second fluid in the phase separator and the flow rate of the second fluid at the inlet to the separation means is between 0.005 and 0.03 L·h/$Nm^3$, or even between 0.006 and 0.023 L·h/$Nm^3$.
  the ratio between the capacity of the heat exchanger and the flow rate of the second fluid at the inlet to the phase separator is between 0.13 and 0.55 L·h/$Nm^3$, or even between 0.137 and 0.547 L·h/$Nm^3$.
  the second fluid is ammonia.

According to another subject of the invention, a device is provided for condensing a first fluid rich in carbon dioxide using a second fluid, comprising:
  a phase separator, in order to obtain a liquid portion and a gaseous portion of said second fluid, connected to an outlet line of the liquid portion and to an outlet line of the gaseous portion; and
  a heat exchanger between the liquid portion of the second fluid and the first fluid, the exchanger being connected to the outlet line of the liquid portion and being connected to an inlet line of the first fluid, to an outlet line of the condensed first fluid and to an outlet line of the vaporized second fluid, the outlet line of the vaporized second fluid being connected to the outlet line of the gaseous portion, without passing through the phase separator.

The fact of completely vaporizing the second fluid, without leaving any liquid, makes it possible to avoid separating the second fluid at the outlet of the exchanger in the separator pot in order to remove the liquid. The size of the separator pot is thus reduced. Thus, the exchanger has no outlet of the second fluid in liquid form.

The device may comprise mixing means for mixing the vaporized second fluid with the gaseous portion.

The device may comprise a distillation column, the top of the column being connected to the heat exchanger in order to introduce thereinto at least one portion of the first fluid.

The device may comprise a first feed line of a first gaseous fraction rich in carbon dioxide originating from the column and a second feed line of a second gaseous fraction rich in carbon dioxide that does not originate from the column, the first and second lines being connected by mixing means outside of the column in order to form the first fluid to be sent to the heat exchanger.

Preferably, there are no cooling means between the outlet of the at least partially vaporized second fluid of the heat exchanger and the phase separator or the line of the gaseous portion originating from the phase separator.

Preferably, there are no compression means between the outlet of the at least partially vaporized second fluid of the heat exchanger and the phase separator or the line of the gaseous portion originating from the phase separator.

This process, which is especially suitable when the temperature gradient is low, consists in using only the liquid part of the refrigerant fluid after expansion, by establishing a thermosiphon between a separator pot, placed upstream of the heat exchanger, and the heat exchanger itself (FIG. 1).

The separator pot then serves both as an inlet separator, for separating the gaseous portion generated by the expansion of the refrigerant fluid from the corresponding liquid portion, and as an outlet separator for separating the vapor generated by the heat exchange in the exchanger from the excess recirculating liquid. This means having a separator pot of relatively large size so that the amount of refrigerant fluid present in the installation is large.

However, taking into account both the cost of the refrigerant fluid and local regulations, in general it is sought to limit the amount of refrigerant fluid in the installation.

A first improvement consists in reducing this amount of refrigerant fluid by directly carrying out a vaporization to dryness of this fluid in the exchanger instead of establishing a thermosiphon.

The refrigerant fluid is, in this case, introduced directly as two phases into the exchanger, with no separator pot, and in a limited amount with a view to having a complete vaporization of the liquid portion, the vapor generated exiting at least partly superheated. This superheating is nevertheless limited by the inlet temperature of the calorigenic fluid, a temperature difference having to be maintained between the two fluids in order to ensure heat exchange.

However, the temperature difference between the two fluids is generally limited for energy reasons, since the pressure of the refrigerant fluid has to remain as high as possible in order to reduce the compression ratio of the compressor of the refrigerant cycle.

In the case where the calorigenic fluid is a vapor in liquid-vapor equilibrium, the possibility of superheating the refrigerant fluid is then very limited.

Furthermore, the direct introduction of a two-phase fluid into an exchanger is tricky, whether it is a tubular exchanger or a compact exchanger, and therefore the risk of maldistribution is high, leading to poor operation of the exchanger which may result in an incomplete vaporization of the refrigerant liquid and therefore in the appearance of droplets of liquid at the inlet of the equipment downstream, which is contrary to the targeted objective.

One particular aspect of the present invention aims to improve the situation.

For this purpose, one subject of the present invention is a device for condensing a first fluid using a second fluid, comprising:
  phase separation means for obtaining a liquid portion and a gaseous portion of said second fluid; and
  heat exchange means between the liquid portion of the second fluid and the first fluid, said exchange means being configured in order to obtain an at least partly liquid first fluid and a superheated second fluid.

A superheated gas results from the vaporization of a liquid. By heating the liquid beyond the boiling point, a superheated gas is obtained.

This aspect of the invention makes it possible to avoid having to introduce the second fluid exiting the exchanger into a thermosiphon. It also makes it possible to avoid the drawbacks of vaporization to dryness. This being while ensuring a circulation of the second fluid downstream completely in vapor phase. There is thus no risk of disrupting the equipment downstream.

Advantageously, the phase separation means are configured to ensure a phase separation between a liquid fraction and a gaseous fraction of said second fluid, originating solely from an expansion of the latter.

In other words, these separation means are, preferably, in the form of a small separator pot sized solely for separating the liquid portion from the vapor generated by an expansion of the refrigerant fluid.

On that subject, according to one characteristic, the device comprises, upstream of the separation means, means for expansion of the second fluid, provided in the liquid state. The separator pot is thus sized in order to separate the liquid portion from the vapor generated by said expansion of the second fluid.

Advantageously, the device also comprises means for mixing the gaseous portion of said second fluid obtained at the outlet of the separation means with the superheated second fluid obtained at the outlet of the heat exchange means.

These mixing means are located downstream of the separator pot so as not to intervene in the sizing thereof. Considering the large difference in flow rate, the resulting vapor mixture remains superheated overall.

According to one characteristic, the ratio between the total volume of the second fluid in the phase separation means and the flow rate of the second fluid at the inlet of the separation means is between 0.01 and 0.05 $L \cdot h/Nm^3$, preferably between 0.012 and 0.047 $L \cdot h/Nm^3$ (here and subsequently, L stands for liter, h for hour, $Nm^3$ for normal meter cube—by way of example, the density of ammonia being 0.76 $kg/Nm^3$, 0.76 kg of ammonia corresponds to 1 $Nm^3$ of ammonia).

According to another characteristic, the ratio between the volume of the liquid portion of the second fluid in the phase separation means and the flow rate of the second fluid at the inlet to the separation means is between 0.005 and 0.03 $L \cdot h/Nm^3$, preferably between 0.006 and 0.0023 $L \cdot h/Nm^3$.

According to yet another characteristic, the ratio between the capacity of the heat exchange means and the flow rate of the second fluid at the inlet to the separation means is between 0.13 and 0.55 $kW \cdot h/Nm^3$, preferably between 0.137 and 0.547 $kW \cdot h/Nm^3$ (here and subsequently kW stands for kilowatt).

According to one preferred embodiment, the device comprises means forming a distillation column of the first fluid, said means being configured in order to provide the first fluid in the gaseous state to the heat exchange means and in order to receive from the heat exchange means the liquid portion of the first fluid.

This embodiment corresponds to the case in which the heat exchanger acts as a top condenser of the column often denoted by the term liquefier of the calorigenic fluid.

Advantageously, in this case, the device comprises, upstream of the heat exchange means, means for mixing a first fraction of the first fluid in the gaseous state, provided by means that form a distillation column, and another fraction of the first fluid also provided in the gaseous state.

Preferably, the other fraction of the first fluid in the gaseous state is superheated. This superheating of the calorigenic fluid makes it possible to increase the superheating of the refrigerant fluid exiting the heat exchange means. This results in a decrease in the flow rate of refrigerant fluid.

Preferably, the first fluid is carbon dioxide ($CO_2$) and the second fluid is ammonia ($NH_3$).

The invention also relates to a process for condensing a first fluid using a second fluid comprising steps of:
  phase separation in order to obtain a liquid portion and a gaseous portion of said second fluid; and heat exchange between the liquid portion of the second fluid and the first fluid in order to obtain an at least partially liquid first fluid and a superheated second fluid.

The invention also relates to a process for distilling a gas rich in carbon dioxide in a column where a condensation process as described above takes place in the top condenser.

BRIEF DESCRIPTION OF THE FIGURES

Exemplary embodiments of the invention will now be described more precisely, but nonlimitingly, with regard to the appended drawings in which.

DETAILED DESCRIPTION OF THE INVENTION

In the remainder of the description, the first calorigenic fluid is carbon dioxide ($CO_2$) and the second refrigerant fluid is assumed to be ammonia ($NH_3$). The invention is not however limited to ammonia as the second fluid.

Figure 1:
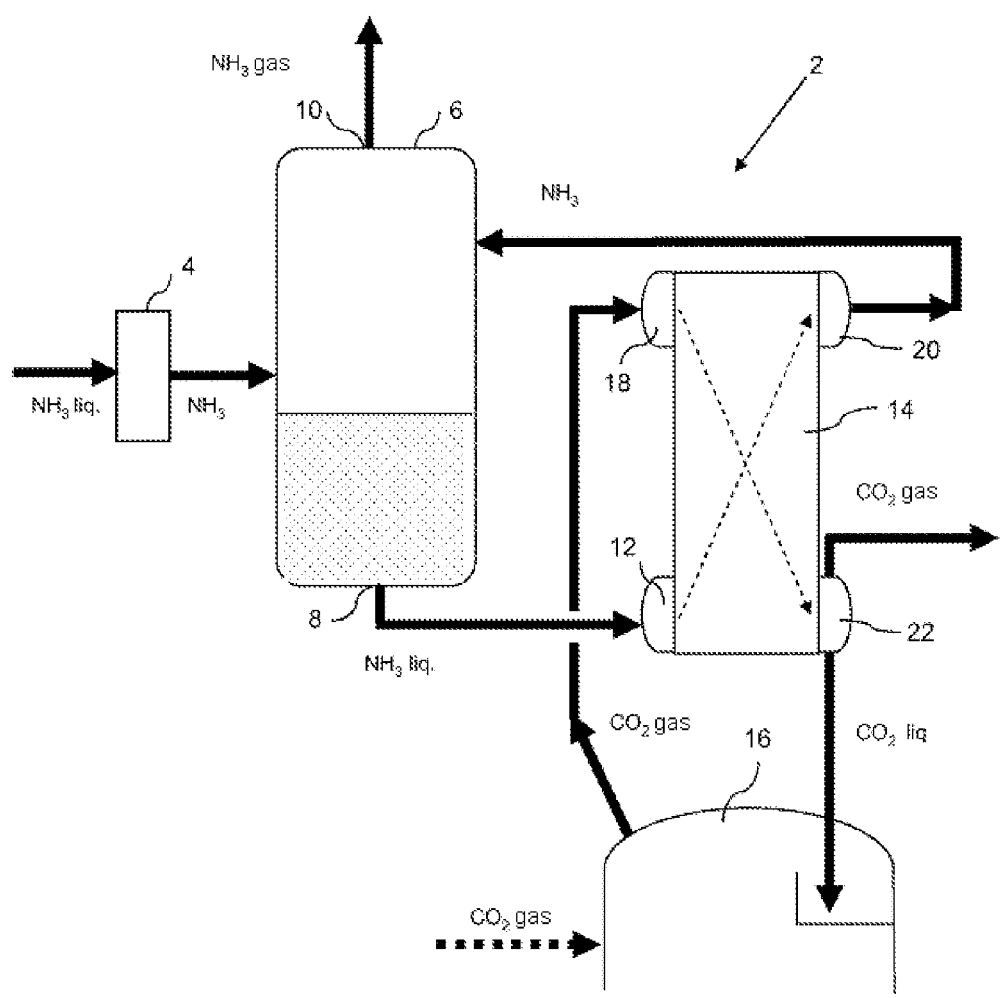
FIG. 1 illustrates a process for condensing a fluid rich in carbon dioxide according to the invention.

FIG. 1 illustrates the structure and the operation of the device 2 using a thermosiphon.

Ammonia is provided to the device 2 in liquid form, at a pressure above the pressure needed to condense carbon dioxide. Expansion means 4 are provided in order to expand the ammonia to the desired operating pressure. This gives rise to a partial vaporization of the ammonia.

The two-phase ammonia thus obtained is supplied to the inlet of a separator pot 6. The separator pot 6 is configured in order to separate the ammonia phases and supplies, at a first outlet 8, liquid ammonia and, at a second outlet 10, gaseous ammonia.

The gaseous ammonia obtained at the second outlet 10 is sent downstream to the remainder of the refrigerant loop, not represented.

The liquid ammonia obtained at the outlet 8 is then supplied to a first inlet 12 of a heat exchanger 14.

In the example from FIG. 1, the heat exchanger 14 is a dephlegmator used in combination with a carbon dioxide distillation column 16.

The distillation column 16 supplies carbon dioxide in the vapor phase to a second inlet 18 of the heat exchanger 14.

In the heat exchanger 14, the cooling of the carbon dioxide by the ammonia produces, at a first outlet 20, two-phase ammonia and, at a second outlet 22, carbon dioxide.

The condensed, that is to say liquid, part of the carbon dioxide is supplied to the distillation column 16.

The two-phase ammonia obtained at the outlet 20 is returned to the separator pot 6 in order to separate its liquid and vapor phases.

The separator pot 6 of the prior art thus serves both as an inlet separator for separating the vapor generated by the expansion of the ammonia from the corresponding liquid phase and as an outlet separator for separating the vapor generated by the heat exchange in the exchanger 14 from the excess recirculating liquid ammonia.

This dual role means using a separator pot of large size so that the amount of ammonia present in the device 2 is high, which is not desirable.

Figure 2:
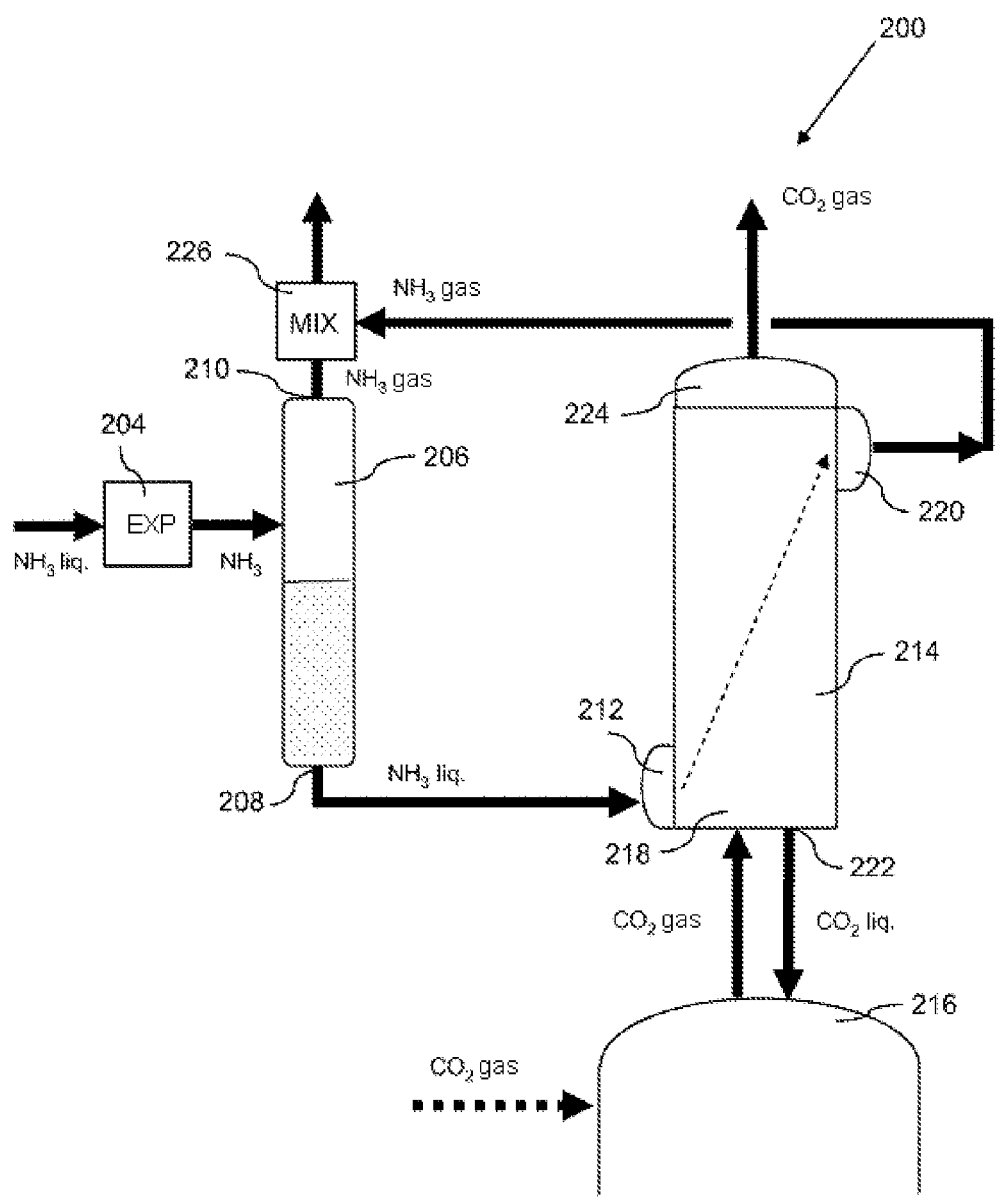
FIG. 2 illustrates the structure of a condensation device according to a first embodiment of the invention.

FIG. 2 illustrates an improvement according to the invention of the device 2 from FIG. 1. For this purpose, FIG. 2 represents a device 200 for condensing carbon dioxide using ammonia.

The ammonia is supplied to the device 200 in liquid form, at a pressure above the pressure needed to condense the carbon dioxide. Expansion means 204 are provided in order to expand the ammonia to the desired operating pressure. This gives rise to a partial vaporization of the ammonia. The flow rate of the resulting gaseous portion of ammonia constitutes a small fraction of the total flow rate of ammonia.

The two-phase ammonia thus obtained is supplied to the inlet of a separator pot 206. The separator pot 206 is configured in order to separate the ammonia phases and supplies, at a first outlet 208, liquid ammonia and, at a second outlet 210, gaseous ammonia.

According to one aspect of the invention, the separator pot 216 is sized solely in order to carry out the separation of the ammonia intended for the heat exchanger. The diameter of this pot 206 is greatly reduced with respect to the diameter of the pot 6 from FIG. 1, given that the flow rate of the resulting gaseous portion of ammonia constitutes a small fraction of the total flow rate of ammonia. Thus, the amount of ammonia stored in the pot 206 is very low with respect to the amount stored in the pot 6 from FIG. 1.

The ratio between the total volume of ammonia in the separator pot 206 and the flow rate of ammonia at the inlet of the separator pot 206 is between 0.01 and 0.05 $L \cdot h/Nm^3$, preferably between 0.012 and 0.047 $L \cdot h/Nm^3$.

The ratio between the volume of the liquid portion of ammonia in the separator pot 206 and the flow rate of ammonia at the inlet of the separator pot 206 is between 0.005 and 0.03 $L \cdot h/Nm^3$, preferably between 0.006 and 0.0023 $L \cdot h/Nm^3$.

The liquid ammonia obtained at the outlet 208 is then supplied to a first inlet 212 of a heat exchanger 214.

In the example from FIG. 2, the heat exchanger 214 is a dephlegmator used in combination with a carbon dioxide distillation column 216.

The invention is not however limited to exchangers of this type, it being possible for the exchanger 214 to be, for example, a counter-current or cross-current cooler or condenser, etc.

Owing to the sizing of the separator pot 206 according to the invention, the amount of liquid ammonia provided to the heat exchanger 214 is limited.

The distillation column 216 provides carbon dioxide in the vapor phase to a second inlet 218 of the heat exchanger 14.

In the heat exchanger 214, the cooling of the carbon dioxide by the ammonia, in a limited amount, produces, at a first outlet 220, entirely vaporized and exclusively superheated ammonia, at a second outlet 222 liquid carbon dioxide and at a third outlet 224 gaseous carbon dioxide.

The condensed, that is to say liquid, part of the carbon dioxide is supplied to the distillation column 216.

The superheated ammonia supplied at the outlet 220 is mixed with the gaseous ammonia produced at the outlet 210 of the separator pot 206 in mixing means 226 before being supplied, in overall superheated form, to the remainder of the refrigerant loop.

Thus, the exchanger 214 has no outlet of the second fluid in liquid form.

Figure 3:
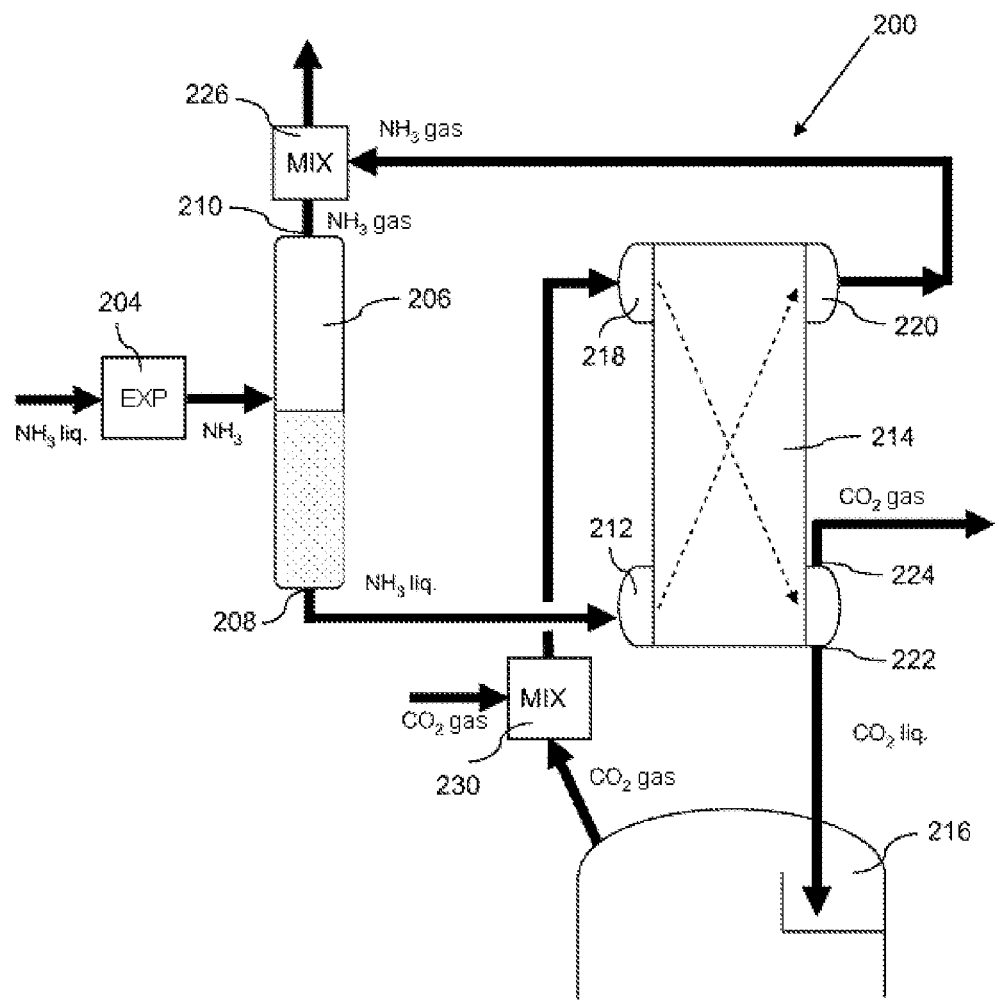
FIG. 3 illustrates the structure of a condensation device according to a second embodiment of the invention.

FIG. 3 illustrates an embodiment variant of the device 200 from FIG. 2 in the particular case where the heat exchanger 214 is a carbon dioxide liquefier.

In the case of such a use, the ascending carbon dioxide vapor of the column 216 constitutes only one part of the carbon dioxide to be condensed, a significant fraction of this carbon dioxide originating from a purification part, not represented, at a temperature above the liquid/vapor equilibrium temperature of carbon dioxide.

The latter superheated fraction of carbon dioxide is generally introduced at the top of the column (FIGS. 1 and 2). It then cools in contact with the reflux of liquid carbon dioxide originating from the condenser 214, to a temperature very close to the liquid-vapor equilibrium temperature. This desuperheating then generates, by evaporation of a part of the reflux, an additional flow of carbon dioxide vapor.

In the device from FIG. 3, mixing means 230 are provided upstream of the exchanger 214 in order to mix the flow of carbon dioxide with the carbon dioxide vapor exiting the column 216, outside thereof and without contact with the liquid carbon dioxide condensed in the exchanger 214.

The mixing of these two gaseous flows of carbon dioxide is again superheated at the inlet of the exchanger 214, which makes it possible to increase the superheating to vapor of the ammonia at the outlet of the exchanger 214.

Thus, the exchanger 214 has no outlet of the second fluid in liquid form.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for condensing a first fluid using an ammonia refrigerant, wherein the first fluid is rich in carbon dioxide, the process comprising the steps of:
    expanding the ammonia refrigerant in an expander to form a two phase ammonia refrigerant;
    introducing the two phase ammonia refrigerant to a phase separator under conditions effective to separate the two phase ammonia refrigerant into a gaseous portion and a liquid portion;
    withdrawing the gaseous portion of the ammonia refrigerant from the phase separator;
    introducing the liquid portion of the ammonia refrigerant to a heat exchanger;
    exchanging heat between the liquid portion of the ammonia refrigerant and the first fluid in the heat exchanger under conditions effective to at least partially condense the first fluid and to fully vaporize the liquid portion of the ammonia refrigerant, thereby forming an at least partially condensed first fluid and a vaporized ammonia refrigerant, wherein the first fluid is rich in carbon dioxide; and
    mixing the vaporized ammonia refrigerant with the gaseous portion of the ammonia refrigerant outside of the phase separator to form a single phase mixture,
    wherein the first fluid originates at least partly from the top of a distillation column and the at least partially condensed first fluid is sent to the top of the distillation column,
    wherein the process further comprises an absence of a step selected from the group consisting of: cooling the vaporized ammonia refrigerant prior to the step of mixing the vaporized ammonia refrigerant with the gaseous portion of the ammonia refrigerant, compressing the vaporized ammonia refrigerant prior to the step of mixing the vaporized ammonia refrigerant with the gaseous portion of the ammonia refrigerant, and combinations thereof,
    wherein the phase separator is sized solely for separating the liquid portion of the ammonia refrigerant from the gaseous portion of the ammonia refrigerant,
    wherein the ratio between the total volume of the ammonia refrigerant in the phase separator and the flow rate of the ammonia refrigerant at the inlet to the phase separator is between 0.01 and 0.05 $L \cdot h/Nm^3$,
    wherein the first fluid comprises a first gaseous fraction rich in carbon dioxide and a second gaseous fraction rich in carbon dioxide, wherein the first gaseous fraction rich in carbon dioxide originates from the top of the distillation column, wherein the second gaseous fraction rich in carbon dioxide does not originate from the distillation column,
    wherein the ratio between the capacity of the heat exchanger and the flow rate of the ammonia refrigerant at the inlet to the phase separator is between 0.13 and 0.55 $kW \cdot h/Nm^3$,
    wherein the second gaseous fraction rich in carbon dioxide is at a superheated temperature in an amount effective to entirely superheat the resulting vaporized ammonia refrigerant prior to the vaporized ammonia refrigerant exiting an outlet of the heat exchanger.

2. The process of claim 1, wherein the ratio between the volume of the liquid portion of the ammonia refrigerant in the phase separator and the flow rate of the ammonia refrigerant at the inlet to the separator is between 0.005 and 0.03 $L \cdot h/Nm^3$.

3. A process for condensing a first fluid using a refrigerant, wherein the first fluid is rich in carbon dioxide, and the refrigerant comprises a single refrigerant of ammonia, the process comprising the steps of:
    expanding the refrigerant in an expander to form a two phase refrigerant;
    introducing the two phase refrigerant to a phase separator under conditions effective to separate the two phase refrigerant into a gaseous portion and a liquid portion;
    introducing the gaseous portion of the refrigerant to a mixing zone;
    introducing the liquid portion of the refrigerant to a heat exchanger;
    introducing a first gaseous fraction rich in carbon dioxide into a first fluid mixing zone, wherein the first gaseous fraction originates from a top portion of a distillation column;
    introducing a second gaseous fraction into the first fluid mixing zone in the presence of the first gaseous fraction to form the first fluid, wherein the second gaseous fraction rich in carbon dioxide originates from a source not comprising the distillation column;
    introducing the first fluid from the first fluid mixing zone to the heat exchanger;
    exchanging heat between the liquid portion of the refrigerant and the first fluid in the heat exchanger under conditions effective to partially condense the first fluid and to fully vaporize the liquid portion of the refrigerant, thereby forming a partially condensed first fluid and a vaporized refrigerant;
    mixing the vaporized refrigerant with the gaseous portion of the refrigerant downstream of the phase separator to form a single phase mixture;
    separating the partially condensed first fluid into a liquid phase and a gaseous phase;

introducing the liquid phase of the partially condensed first fluid from the heat exchanger into the top portion of the distillation column; and recovering the gaseous phase of the partially condensed first fluid, wherein the process further comprises an absence of a step selected from the group consisting of: cooling the vaporized refrigerant prior to the step of mixing the vaporized refrigerant with the gaseous portion of the refrigerant, compressing the vaporized refrigerant prior to the step of mixing the vaporized refrigerant with the gaseous portion of the refrigerant, and combinations thereof, wherein the ratio between the total volume of the liquid portion of the refrigerant in the phase separator and the flow rate of the liquid portion of the refrigerant at the inlet to the phase separator is between 0.005 and 0.03 $L \cdot h/Nm^3$, wherein the phase separator is sized solely for separating the liquid portion of the two phase refrigerant from the gaseous portion of the two phase refrigerant generated by the expansion of the refrigerant, wherein the ratio between the capacity of the heat exchanger and the flow rate of the ammonia refrigerant at the inlet to the phase separator is between 0.13 and 0.55 $kW \cdot h/Nm^3$, wherein the second gaseous fraction rich in carbon dioxide is at a superheated temperature in an amount effective to entirely superheat the resulting vaporized ammonia refrigerant prior to the vaporized ammonia refrigerant exiting an outlet of the heat exchanger.

4. The process of claim 3, wherein the first fluid mixing zone is disposed completely outside of the distillation column and the heat exchanger.

5. The process of claim 1, wherein the phase separator is configured to not receive the vaporized ammonia refrigerant directly from the outlet of the heat exchanger.

6. The process of claim 1, wherein the process comprises an absence of introducing any other fluid to the phase separator other than the ammonia refrigerant.

7. The process of claim 1, wherein the first gaseous fraction rich in carbon dioxide is at a first temperature that is colder than that of the second gaseous fraction rich in carbon dioxide, such that when the first gaseous fraction and the second gaseous fraction are mixed upstream of the heat exchanger, the first fluid has a temperature that is warmer than the first temperature.

* * * * *